(12) United States Patent
Zhang et al.

(10) Patent No.: US 10,194,412 B2
(45) Date of Patent: Jan. 29, 2019

(54) UPLINK SYNCHRONIZATION METHOD AND TERMINAL

(71) Applicant: Huawei Technologies Co., Ltd., Shenzhen, Guangdong (CN)

(72) Inventors: Lei Zhang, Shenzhen (CN); Jian Li, Shanghai (CN); Liang Hu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 15/184,702

(22) Filed: Jun. 16, 2016

(65) Prior Publication Data
US 2016/0295540 A1    Oct. 6, 2016

Related U.S. Application Data

(63) Continuation of application No. PCT/CN2013/089690, filed on Dec. 17, 2013.

(51) Int. Cl.
| | |
|---|---|
| *H04W 56/00* | (2009.01) |
| *H04W 74/08* | (2009.01) |
| *H04L 5/00* | (2006.01) |
| *H04B 7/04* | (2017.01) |
| *H04B 7/02* | (2018.01) |
| *H04W 74/00* | (2009.01) |

(52) U.S. Cl.
CPC .......... *H04W 56/0045* (2013.01); *H04B 7/04* (2013.01); *H04L 5/0048* (2013.01); *H04W 74/0833* (2013.01); *H04B 7/02* (2013.01); *H04W 74/002* (2013.01)

(58) Field of Classification Search
None
See application file for complete search history.

(56) References Cited

U.S. PATENT DOCUMENTS

| | | | |
|---|---|---|---|
| 2007/0002766 A1 | 1/2007 | Park et al. | |
| 2013/0034038 A1 | 2/2013 | Jang et al. | |
| 2013/0107851 A1 | 5/2013 | Park et al. | |
| 2014/0177540 A1* | 6/2014 | Novak | ............... H04W 72/042 |
| | | | 370/329 |
| 2015/0131566 A1* | 5/2015 | Seo | ...................... H04B 1/3838 |
| | | | 370/329 |

FOREIGN PATENT DOCUMENTS

| | | |
|---|---|---|
| CN | 1901400 A | 1/2007 |
| CN | 101365220 A | 2/2009 |
| CN | 101540634 A | 9/2009 |
| CN | 102055705 A | 5/2011 |

(Continued)

*Primary Examiner* — Jason E Mattis
*Assistant Examiner* — Hong Shao

(57) ABSTRACT

An uplink synchronization method and a terminal are disclosed, where implementation of the terminal is as follows: a supporting terminal sends the reference signal by using a access identifier of a benefited terminal, and receives a adjustment value of synchronization information of the supporting terminal, so that uplink synchronization is implemented. The supporting terminal does not need to access a network, and therefore interference caused by the supporting terminal to another terminal and the benefited terminal on an access device side is avoided, and a preamble signal resource is reduced.

2 Claims, 7 Drawing Sheets

(56) References Cited

FOREIGN PATENT DOCUMENTS

| | | | | |
|---|---|---|---|---|
| CN | 102164403 A | | 8/2011 | |
| CN | 102196552 A | * | 9/2011 | ............ H04W 56/00 |
| CN | 102740447 A | | 10/2012 | |
| CN | 102870340 A | | 1/2013 | |
| WO | 2012/008741 A2 | | 1/2012 | |

* cited by examiner

UPLINK SYNCHRONIZATION METHOD AND TERMINAL

CROSS-REFERENCE TO RELATED APPLICATIONS

This application is a continuation of International Application No. PCT/CN2013/089690, filed on Dec. 17, 2013, which is hereby incorporated by reference in the entirety.

TECHNICAL FIELD

The present invention relates to the field of communications technologies, and in particular, to an uplink synchronization method and a terminal.

BACKGROUND

Increasing terminal antennas is one of important means for improving spectral efficiency to further enhance a network capacity, and currently increasing terminal antennas is mainly limited to the following several aspects:

1. Terminal volume: a device that currently accesses a cellular network is mainly a handheld device, for example, a mobile phone, and limited by a size of the device that currently accesses the cellular network, an application of a multiple-antenna technology is limited on a terminal side.

2. Antenna coupling and channel relevancy: Within a limited volume, arranging multiple antennas that work in a same frequency band may result in coupling enhancement between the antennas and channel relevancy enhancement, which degrades system performance. On the other hand, the channel relevancy enhancement may reduce a quantity of layers for spatial multiplexing, and therefore, improving of the spectral efficiency is limited.

3. Because of an application of carrier aggregation, a cellular frequency band presents a polarized development. On one hand, a high frequency band is applied to a cellular frequency band to improve the spectral efficiency. On the other hand, an application of a low frequency band (for example, a frequency band released by an analog television) enlarges an antenna size, and further reduces a quantity of antennas in a single device.

4. Another limitation of multiple antennas on the terminal side is costs of a radio-frequency channel.

A terminal coordinated communication solution is a solution in which increasing a quantity of (virtual) antennas is implemented by a terminal by means of antenna sharing and coordinated communication. The terminal coordinated communication solution can break the foregoing several limitations, and can improve and enhance the system performance. In a communication process, a terminal with a service is referred to as a benefited terminal, and a terminal that assists the benefited terminal in performing communication is referred to as a supporting terminal, where the supporting terminal shares an antenna of the supporting terminal with the benefited terminal.

On one hand of the terminal coordinated communication solution, by means of collaboration between terminals, a spatial dimension that can be used on the terminal side can be effectively enhanced, and a system capacity is enhanced. On the other hand, by means of collaboration between terminals, interference from an adjacent terminal can be effectively suppressed, and transmission quality is improved. What is different from coordinated transmission on a network side is that there is no high-speed optical fiber or another dedicated transmission link between terminal nodes for completing interaction of shared information. Generally, for information sharing between the terminal nodes, information transmission needs to be completed by using an air interface link. Currently, main standardization organizations including 3GPP (Third Generation Partnership Project) have already started research and standardization work of D2D (device-to-device) direct communication. A continuous development of a near field communication technology such as WiFi (Wireless Fidelity) has brought near field transmission into a G-bit era. These provide a reliable transmission solution for direct information interaction between terminals.

In addition, a product based on wireless communication is increasingly popularized, each user concurrently has multiple terminals (single-user multi-terminal) that can access the cellular network, and when an antenna of each terminal is idle, the antenna may be used to collaborate with another terminal in communication.

In an implementation process of the foregoing terminal collaboration solution, when each UE (terminal device) sends an uplink signal to a base station, because positions of all UE and the base station are different and multipath paths that all the UE passes through are different, when different UE sends uplink signals at a same moment, the signals received by the base station cannot be aligned (that is, signals from all the UE arrive at the base station at different moments), and this phenomenon may cause interference between terminals. To avoid occurrence of this phenomenon, TA (time advance) is introduced in 3GPP for uplink time synchronization.

In the terminal coordinated communication technology, different internal delays and different external multipaths that are of the supporting terminal and the benefited terminal result in different TA between UE. Because there is no service in the supporting terminal, the supporting terminal does not need to perform network access in principle. However, in some scenarios, the supporting terminal needs to send an uplink signal. For example, in a TDD (time division duplex) system, the supporting terminal sends uplink sounding according to a configuration of the benefited terminal, and the base station schedules a best resource for the benefited terminal according to an uplink aggregate channel of the supporting terminal and the benefited terminal. Another application scenario is that in a system of uplink terminal coordinated communication, the supporting terminal collaborates with the benefited terminal in sending data to the base station.

In the terminal coordinated communication technology, the supporting terminal needs to completely access the network and complete uplink synchronization, and then can send the uplink signal; otherwise, interference to another terminal is caused.

SUMMARY

Embodiments of the present invention provide an uplink synchronization method and a terminal, which are used to implement uplink synchronization without requiring a supporting terminal to access a network.

A first aspect of the embodiments of the present invention provides a terminal, where the terminal is a supporting terminal, including:

an information acquiring unit, configured to: acquire an access identifier of a benefited terminal, and acquire an uplink port number used by the supporting terminal to send a reference signal;

a reference signal sending unit, configured to send a reference signal to an access device through an uplink port by using the access identifier of the benefited terminal;

an adjustment value receiving unit, configured to receive an uplink synchronization information adjustment value from the access device; and a synchronization unit, configured to perform uplink synchronization according to the uplink synchronization information adjustment value that is received by the adjustment value receiving unit.

With reference to an implementation manner of the first aspect, in a first possible implementation manner, the terminal further includes:

a request receiving unit, configured to receive a random access request from the benefited terminal before the reference signal sending unit sends the reference signal to the access device through the uplink port;

a preamble sending unit, configured to send a preamble signal to the access device after the access request receives the random access request; and a synchronization information receiving unit, configured to receive uplink synchronization information returned by the access device according to the preamble signal, where the synchronization unit is further configured to perform uplink synchronization according to the uplink synchronization information received by the synchronization information receiving unit.

With reference to the first aspect or the first possible implementation manner of the first aspect, in a second possible implementation manner, the information acquiring unit includes:

a port number acquiring unit, configured to: confirm an uplink port number currently used by the supporting terminal, or receive an uplink port number allocated by the benefited terminal to the supporting terminal.

A second aspect of the embodiments of the present invention provides a terminal, where the terminal is a benefited terminal, including:

a port number acquiring unit, configured to acquire an uplink port number used by a supporting terminal to send a reference signal;

a port number sending unit, configured to send, to an access device through an uplink port, an uplink port number used by the benefited terminal to send a reference signal and the uplink port number that is used by the supporting terminal to send a reference signal and that is acquired by the port number acquiring unit;

a reference signal sending unit, configured to send a reference signal to the access device;

an adjustment value receiving unit, configured to receive an uplink synchronization information adjustment value from the access device; and a synchronization unit, configured to perform uplink synchronization according to the uplink synchronization information adjustment value that is received by the adjustment value receiving unit.

With reference to an implementation manner of the second aspect, in a first possible implementation manner, the port number acquiring unit is configured to: allocate, to the supporting terminal, the uplink port number used to send the reference signal, send the uplink port number to the supporting terminal, and determine that the uplink port number sent to the supporting terminal is the uplink port number used by the supporting terminal to send the reference signal; or receive the uplink port number that is sent by the benefited terminal to the benefited terminal and that is used to send the reference signal.

With reference to the second aspect or the first possible implementation manner of the second aspect, in a second possible implementation manner, the terminal further includes:

a request sending unit, configured to send a random access request to the supporting terminal before the port number acquiring unit acquires the uplink port number used by the supporting terminal to send the reference signal, so that the supporting terminal initiates random access to the access device and obtains uplink synchronization information.

A third aspect of the embodiments of the present invention provides an access device, including:

a reference signal receiving unit, configured to: receive a reference signal that is sent by a benefited terminal by using an access identifier of the benefited terminal, and receive a reference signal that is sent by a supporting terminal by using the access identifier of the benefited terminal;

an adjustment value calculating unit, configured to: calculate a synchronization information adjustment value of the benefited terminal according to the reference signal sent by the benefited terminal; and calculate a synchronization information adjustment value of the supporting terminal according to the reference signal sent by the supporting terminal, and send the adjustment value to the supporting terminal; and an adjustment value sending unit, configured to: send the synchronization information adjustment value of the benefited terminal and that is calculated by the adjustment value calculating unit to the benefited terminal; and send the synchronization information adjustment value of the supporting terminal and that is calculated by the adjustment value calculating unit to the supporting terminal.

With reference to an implementation manner of the third aspect, in a first possible implementation manner, the access device further includes:

a port number receiving unit, configured to receive an uplink port number from the benefited terminal, where the uplink port number from the benefited terminal includes an uplink port number of the benefited terminal and an uplink port number of the supporting terminal; and a mapping determining unit, configured to determine a correspondence between a uplink port number and a benefited terminal or a supporting terminal according to a mapping rule.

A fourth aspect of the embodiments of the present invention provides an uplink synchronization method, including:

acquiring, by a supporting terminal, an access identifier of a benefited terminal, and acquiring an uplink port number used by the supporting terminal to send a reference signal;

sending, by the supporting terminal, a reference signal to an access device through an uplink port by using the access identifier of the benefited terminal;

receiving, by the supporting terminal, an uplink synchronization information adjustment value from the access device; and performing, by the supporting terminal, uplink synchronization according to the received uplink synchronization information adjustment value.

With reference to an implementation manner of the fourth aspect, in a first possible implementation manner, before the sending a reference signal to an access device through an uplink port, the method further includes:

receiving, by the supporting terminal, a random access request from the benefited terminal;

sending, by the supporting terminal, a preamble signal to the access device, and receiving uplink synchronization information returned by the access device according to the preamble signal; and performing, by the supporting terminal, uplink synchronization according to the received uplink synchronization information.

With reference to the fourth aspect or the first possible implementation manner of the fourth aspect, in a second possible implementation manner, the acquiring an uplink port number used by the supporting terminal to send a reference signal includes:

confirming, by the supporting terminal, an uplink port number currently used by the supporting terminal, or receiving, by the supporting terminal, an uplink port number allocated by the benefited terminal to the supporting terminal.

A fifth aspect of the embodiments of the present invention provides an uplink synchronization method, including:

acquiring, by a benefited terminal, an uplink port number used by a supporting terminal to send a reference signal, and sending, to an access device through an uplink port, an uplink port number used by the benefited terminal to send the reference signal and the uplink port number used by the supporting terminal to send the reference signal;

sending, by the benefited terminal, the reference signal to the access device through an uplink port;

receiving, by the benefited terminal, an uplink synchronization information adjustment value from the access device; and performing, by the benefited terminal, uplink synchronization according to the received uplink synchronization information adjustment value.

With reference to an implementation manner of the fifth aspect, in a first possible implementation manner, the acquiring, by a benefited terminal, an uplink port number used by a supporting terminal to send a reference signal includes:

allocating, by the benefited terminal to the supporting terminal, an uplink port number used to send a reference signal, sending the allocated uplink port number to the supporting terminal, and determining that the uplink port number sent to the supporting terminal is the uplink port number used by the supporting terminal to send a reference signal; or receiving an uplink port number that is sent by the benefited terminal to the benefited terminal and that is used to send a reference signal.

With reference to the fifth aspect or the first possible implementation manner of the fifth aspect, in a second possible implementation manner, before the acquiring, by a benefited terminal, an uplink port number used by a supporting terminal to send a reference signal, the method further includes:

sending, by the benefited terminal, a random access request to the supporting terminal, so that the supporting terminal initiates random access to the access device and obtains uplink synchronization information.

A sixth aspect of the embodiments of the present invention provides an uplink synchronization method, including:

receiving, by an access device, a reference signal that is sent by a benefited terminal by using an access identifier of the benefited terminal, and receiving a reference signal that is sent by the supporting terminal by using the access identifier of the benefited terminal;

calculating, by the access device, a synchronization information adjustment value of the benefited terminal according to the reference signal sent by the benefited terminal, and sending the adjustment value to the benefited terminal; and calculating a synchronization information adjustment value of the supporting terminal according to the reference signal sent by the supporting terminal, and sending the adjustment value to the supporting terminal.

With reference to an implementation manner of the sixth aspect, in a first possible implementation manner, the method further includes:

receiving, by the access device, an uplink port number from the benefited terminal, where the uplink port number from the benefited terminal includes an uplink port number of the benefited terminal and an uplink port number of the supporting terminal; and determining, by the access device, a correspondence between a uplink port number and a benefited terminal or a supporting terminal according to a mapping rule.

It can be learnt from the foregoing technical solutions that, the embodiments of the present invention have the following advantage: a supporting terminal sends a reference signal by using an access identifier of a benefited terminal, and then receives a synchronization information adjustment value of the supporting terminal, so that uplink synchronization is implemented. In this solution, the supporting terminal does not need to access a network, and therefore, interference caused by the supporting terminal to another terminal and the benefited terminal on an access device side is avoided, and a preamble (preamble signal) resource is reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present disclosure clearer, the following further describes the present disclosure in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

Figure 1:
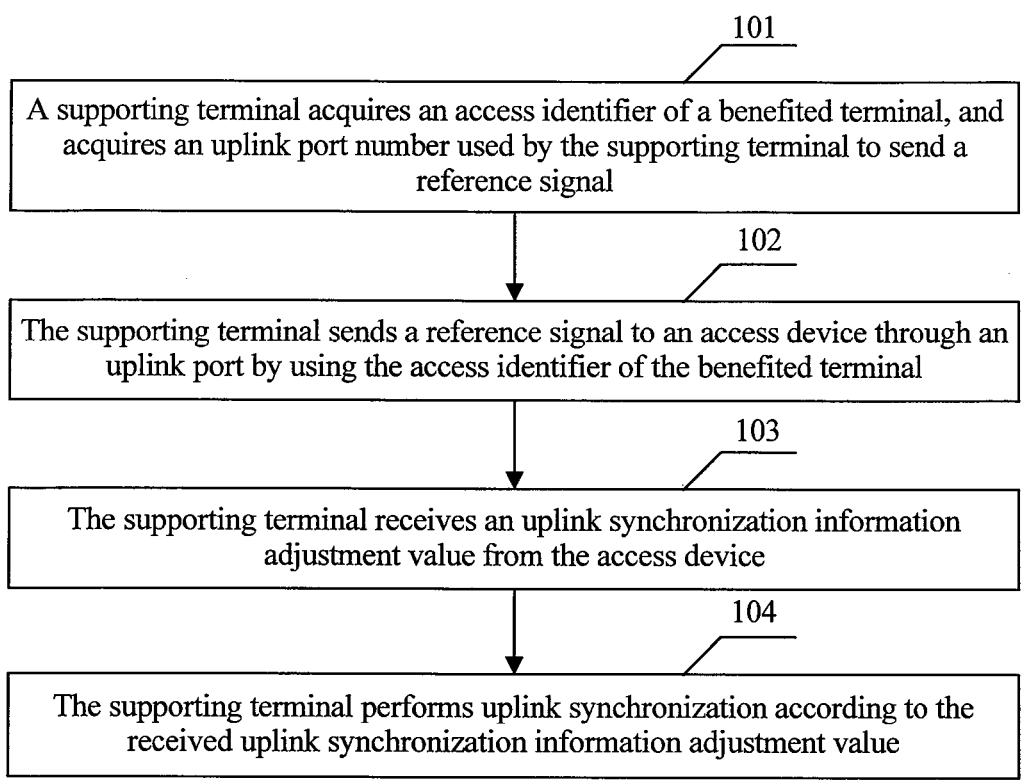
FIG. 1 is a schematic flowchart of a method according to an embodiment of the present invention.

An embodiment of the present invention provides an uplink synchronization method, as shown in FIG. 1, including the following steps:

101. A supporting terminal acquires an access identifier of a benefited terminal, and acquires an uplink port number used by the supporting terminal to send a reference signal.

The access identifier is a recognition identifier that is allocated by an access device to a terminal in a process in which the terminal accesses the access device. The access device may be various access devices, for example, a BS (base station). There is a wide variety of access devices, and this embodiment of the present invention sets no limitation thereto.

102. The supporting terminal sends a reference signal to an access device through an uplink port by using the access identifier of the benefited terminal.

In a procedure shown in FIG. 1, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution of initial synchronization, which is as follows: In step 102, before the sending a reference signal to an access device through an uplink port, the method further includes: receiving, by the supporting terminal, a random access request from the benefited terminal; sending, by the supporting terminal, a preamble signal to the access device, and receiving uplink synchronization information returned by the access device according to the preamble signal; and performing, by the supporting terminal, uplink synchronization according to the received uplink synchronization information.

In this embodiment of the present invention, the preamble signal sent by the supporting terminal is a preamble signal used for access. However, the access device does not need to allocate an access identifier to the supporting terminal, and only needs to determine initial synchronization information. Therefore, the supporting terminal does not need to access a wireless network.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Before the sending a reference signal to an access device through an uplink port, the method further includes: confirming, by the supporting terminal, an uplink port number currently used by the supporting terminal, or receiving, by the supporting terminal, an uplink port number allocated by the benefited terminal to the supporting terminal.

In the foregoing embodiment, after receiving the uplink port number allocated by the benefited terminal to the supporting terminal, the access device may further send a confirmation message to the benefited terminal, to notify the benefited terminal that the uplink port number is received.

103. The supporting terminal receives an uplink synchronization information adjustment value from the access device.

Before step 103, on an access device side, the access device may calculate the adjustment value of the synchronization information according to the reference signal. The synchronization information is a parameter required to perform uplink synchronization, and may have different representation forms according to different protocols. For example, the synchronization information may be information about TA. A representation form of the synchronization information is not limited in this embodiment of the present invention.

104. The supporting terminal performs uplink synchronization according to the received uplink synchronization information adjustment value.

The foregoing embodiment is implemented on a supporting terminal side, where a supporting terminal sends a reference signal by using an access identifier of a benefited terminal, and then receives a synchronization information adjustment value of the supporting terminal, so that uplink synchronization is implemented. In this solution, the supporting terminal does not need to access a network, and therefore, interference caused by the supporting terminal to another terminal and the benefited terminal on an access device side is avoided, and a preamble resource is reduced.

Figure 2:
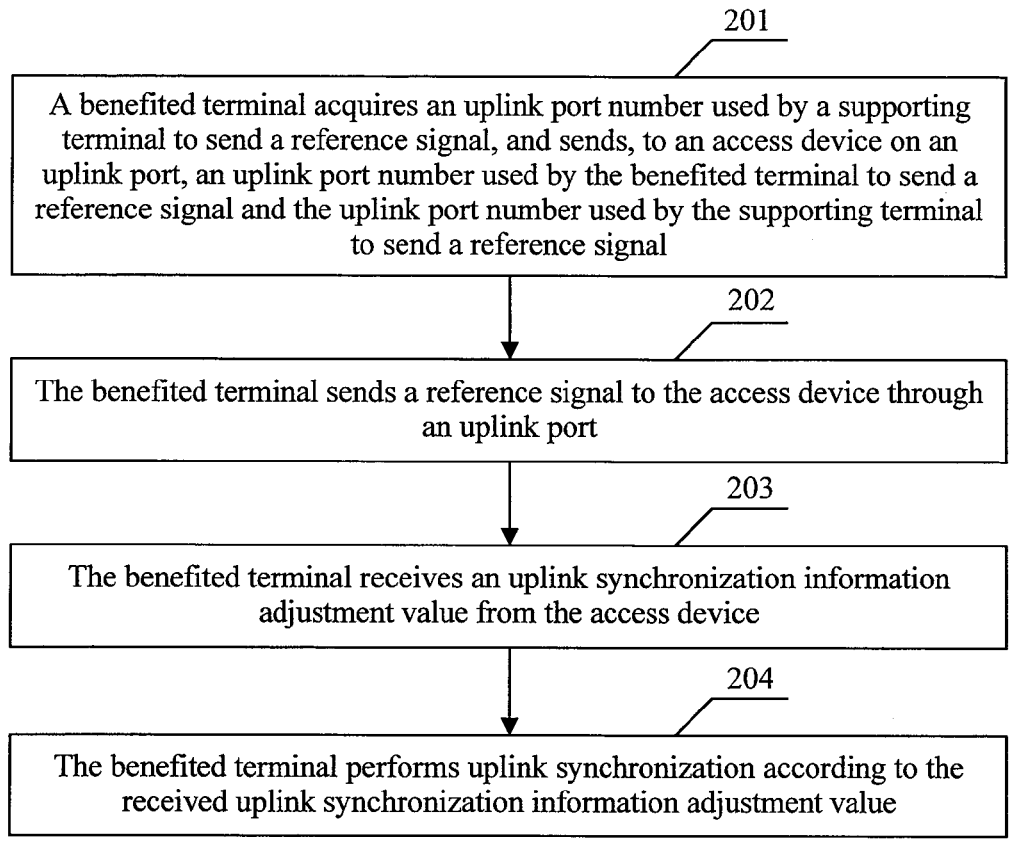
FIG. 2 is a schematic flowchart of a method according to an embodiment of the present invention.

An embodiment of the present invention further provides another uplink synchronization method, as shown in FIG. 2, including the following steps:

201. A benefited terminal acquires an uplink port number used by a supporting terminal to send a reference signal, and sends, to an access device through an uplink port, an uplink port number used by the benefited terminal to send a reference signal and the uplink port number used by the supporting terminal to send a reference signal.

In this embodiment of the present invention, the uplink port number used by the supporting terminal to send the reference signal may be determined by the supporting terminal, or may be obtained by negotiating with the benefited terminal. This embodiment of the present invention provides an example for a solution of a source of the uplink port number used by the supporting terminal to send a reference signal, which is as follows: That a benefited terminal acquires an uplink port number used by a supporting terminal to send a reference signal includes: allocating, by the benefited terminal to the supporting terminal, an uplink port number used to send the reference signal, sending the uplink port number to the supporting terminal, and determining that the uplink port number sent to the supporting terminal is the uplink port number used by the supporting terminal to send the reference signal; or receiving an uplink port number that is sent by the benefited terminal to the benefited terminal and that is used to send the reference signal.

In a procedure shown in FIG. 2, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution in which the benefited terminal triggers the supporting terminal to perform initial synchronization, which is as follows: before step 201 in which a benefited terminal acquires an uplink port number used by a supporting terminal to send a reference signal, the method further includes: sending, by the benefited terminal, a random access request to the supporting terminal, so that the supporting terminal initiates random access to the access device and obtains uplink synchronization information.

202. The benefited terminal sends a reference signal to the access device through an uplink port.

In this step, the benefited terminal sends the uplink port number. There are many solutions for determining a correspondence between an uplink port number and each terminal on an access device side, and several examples are described in detail in a subsequent embodiment.

203. The benefited terminal receives an uplink synchronization information adjustment value from the access device.

Before step 203, on an access device side, the access device may calculate the adjustment value of the synchronization information according to the reference signal. The synchronization information is a parameter required to perform uplink synchronization, and may have different representation forms according to different protocols. For example, the synchronization information may be information about TA. A representation form of the synchronization information is not limited in this embodiment of the present invention.

204. The benefited terminal performs uplink synchronization according to the received uplink synchronization information adjustment value.

The foregoing embodiment is implemented on a benefited terminal side, where a benefited terminal is a demand side of a service, the benefited terminal necessarily accesses a network, and the benefited terminal reports an uplink port number of the benefited terminal by accessing the network, and assists a supporting terminal in reporting work of an uplink port number, so that the supporting terminal does not need to access the network. Therefore, interference caused by the supporting terminal to another terminal and the benefited terminal on an access device side is avoided, and a preamble (preamble signal) resource is reduced.

Figure 3:
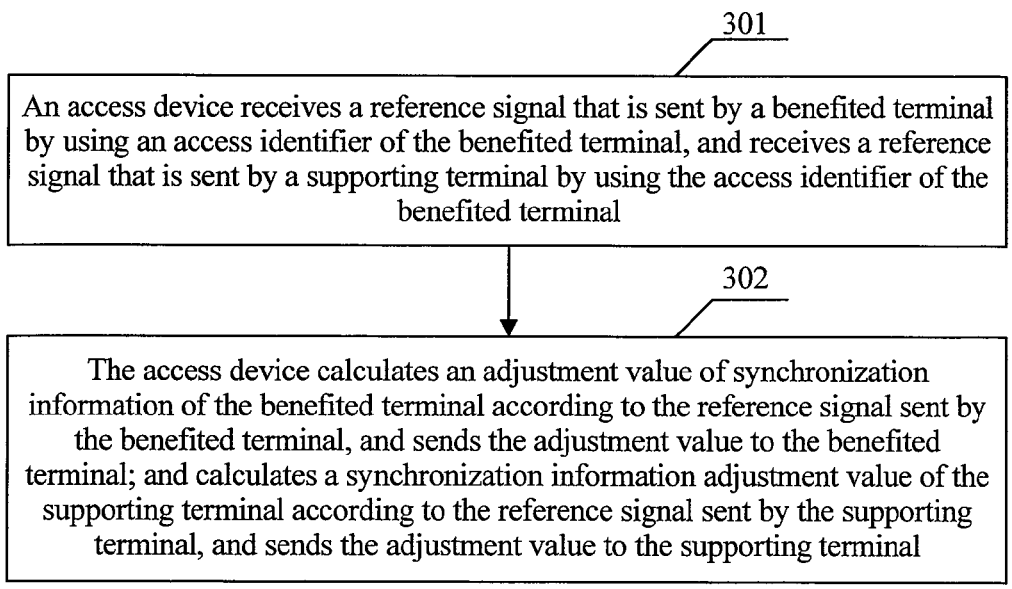
FIG. 3 is a schematic flowchart of a method according to an embodiment of the present invention.

An embodiment of the present invention further provides another uplink synchronization method, as shown in FIG. 3, including the following steps:

301. An access device receives the reference signal that is sent by a benefited terminal by using an access identifier of the benefited terminal, and receives the reference signal that is sent by the supporting terminal by using the access identifier of the benefited terminal.

Further, this embodiment of the present invention further provides a solution for obtaining an uplink port number on an access device side, which may be specifically as follows: the method further includes: receiving, by the access device, an uplink port number from the benefited terminal, where the uplink port number from the benefited terminal includes an uplink port number of the benefited terminal and an uplink port number of the supporting terminal; and determining, by the access device, a correspondence between a uplink port number and a benefited terminal or a supporting terminal according to a mapping rule.

The mapping rule may be a default mapping rule, or may be a mapping rule that is subsequently notified when the benefited terminal sends the uplink port number. A source of the mapping rule does not affect implementation of this embodiment of the present invention, and is not limited in this embodiment of the present invention.

302. The access device calculates a synchronization information adjustment value of the benefited terminal according to the reference signal sent by the benefited terminal, and sends the adjustment value to the benefited terminal; and calculates a synchronization information adjustment value of the supporting terminal according to the reference signal sent by the supporting terminal, and sends the adjustment value to the supporting terminal.

The foregoing embodiment is implemented on an access device side, where a supporting terminal sends a reference signal by using an access identifier of a benefited terminal, and then receives a synchronization information adjustment value of the supporting terminal, so that uplink synchronization of the benefited terminal is implemented. In addition, reporting work of an uplink port number used by the supporting terminal to send a reference signal is implemented with assistance of the benefited terminal. In this solution, the supporting terminal does not need to access a network, and therefore, interference caused by the supporting terminal to another terminal and the benefited terminal on the access device side is avoided, and a preamble resource is reduced.

Figure 4:
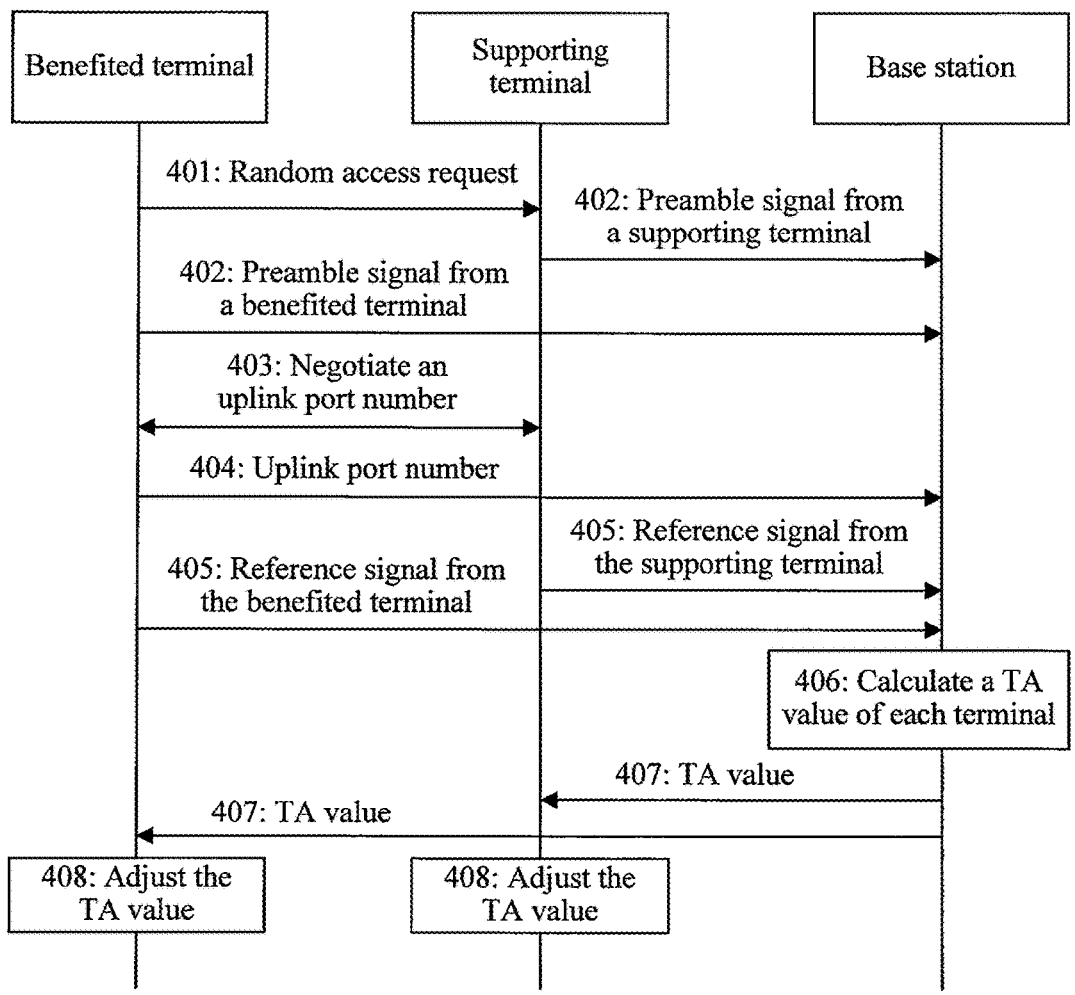
FIG. 4 is a schematic flowchart of a method according to an embodiment of the present invention.

The foregoing separately provides solutions for implementing uplink synchronization on a supporting terminal side, a benefited terminal side, and an access device side. The following embodiment provides a comprehensive embodiment, which gives a more detailed description of an embodiment of the present invention. In this embodiment, for example, an access device is a BS, and synchronization information is TA. In this embodiment, uplink synchronization is divided into two parts: (1) initial synchronization; (2) a synchronization update. Specifically, as shown in FIG. 4, this embodiment includes the following steps:

401. In a process of initial synchronization, when a benefited terminal needs a supporting terminal to perform uplink data/signal transmission, the benefited terminal first sends a random access request to the supporting terminal, to request the supporting terminal to randomly access a network.

402. After receiving the random access request, the supporting terminal sends a preamble signal to a base station, and the benefited terminal also sends a preamble signal to the base station.

In this step, both the supporting terminal and the benefited terminal execute a step of network access, and a difference is as follows: the benefited terminal executes a complete access procedure and obtains a UE ID (identity), where the UE ID is also referred as an access identifier because the UE ID is used to access a network; for the supporting terminal, the supporting terminal does not need to fully complete a random access process (that is, the supporting terminal acquires the UE ID).

After this step is executed, on a base station side, the base station measures TA of the supporting terminal, and feeds back the TA to the supporting terminal, and the supporting terminal adjusts sending TA to implement initial uplink synchronization. The base station also measures TA of the benefited terminal, and feeds back the TA to the benefited terminal. In this way, the benefited terminal and the supporting terminal separately implement first uplink synchronization. The following describes how to implement an adjustment of uplink synchronization.

403. The benefited terminal and the supporting terminal negotiate an uplink port number.

An objective of this step is that the benefited terminal obtains an uplink port number used by the supporting terminal to send a reference signal, and the supporting terminal learns an uplink port number used by the benefited terminal to send the reference signal, where the uplink port number is a port number used by a terminal to send the reference signal, and both the benefited terminal and the supporting terminal have the uplink port numbers of the supporting terminal and the benefited terminal.

404. The benefited terminal sends the uplink port number to the base station.

In this step, the uplink port number sent by the benefited terminal includes the uplink port number used by the benefited terminal to send a reference signal, and further includes the uplink port number used by the supporting terminal to send a reference signal. Therefore, the uplink port number used by the supporting terminal to send a reference signal is sent to the base station with assistance of the benefited terminal.

405. The benefited terminal sends a reference signal through an uplink port, and the supporting terminal sends a reference signal through an uplink port.

The reference signal is a parameter used to measure a TA value, and may generally be implemented by using a pilot signal.

It should be noted that in this step, it may be understood that ports used by the benefited terminal and the supporting terminal to send reference signals are corresponding to corresponding port numbers of the ports. The reference signal sent by the supporting terminal is sent by using an ID of the benefited terminal. Therefore, before this step, signal sending of the supporting terminal needs to be configured by using the ID of the benefited terminal. For example, when the benefited terminal needs the supporting terminal to send a reference signal, the benefited terminal notifies the supporting terminal of an allocated port number of an antenna and the ID of the benefited terminal, and the supporting terminal scrambles the reference signal by using the parameters and sends the reference signal to the base station. An antenna port that is of the supporting terminal and that is received on the base station side is equivalent to a distributed antenna of the benefited terminal.

406. The base station separately calculates, according to the reference signal, a TA value corresponding to each uplink port number.

In this step, the base station does not need to know a terminal to which each reference signal is corresponding, and the base station may even not know existence of the benefited terminal. Information about the uplink port number corresponding to the benefited terminal is carried in the reference signal, and therefore, the TA value calculated by the base station is corresponding to a port number carried in the reference signal.

In this step, the base station needs to learn a mapping relationship between an uplink port number and a terminal. Therefore, the supporting terminal or the benefited terminal needs to send a mapping relationship of a port number to the base station in advance. For example, the benefited terminal sends a reference signal by using a port 1, and the supporting terminal sends a reference signal by using a port 2; then, the base station separately calculates TA values of the two terminals within a synchronization period by using a reference signal sent through a port corresponding to each UE.

A mapping relationship between a port number and UE may be notified to the base station in the following several (embodiments) manners:

1. The UE sends allocation and identifiers of ports of all coordinated terminals to the base station by using uplink data or a control channel. For example, there is one benefited terminal (UE1) and two supporting terminals (UE2 and UE3) in total, and each terminal has two uplink ports; then, there are six ports in total, and UE corresponding to each port is separately defined. It is assumed that in this case, each terminal has two uplink reference signal ports, port numbers of the UE1 are a port 1 and a port 2, port numbers of the UE2 are a port 3 and a port 4, and port numbers of the UE3 are a port 5 and a port 6. The base station receives reference signals from the six ports, and the base station calculates TA of the UE1 according to data of the port 1 and the port 2 in data of the six ports, calculates TA of the UE2 according to data of the port 3 and the port 4, and calculates TA of the UE3 according to data of the port 5 and the port 6.

2. Compared with the foregoing solution, information that is about a correspondence between a port and UE and that is fed back by a terminal to the base station is presented in another manner. In this case, uplink feedback information is a quantity of UEs and a preset port mapping policy. For example, there is one benefited terminal (UE1) and two supporting terminals (UE2 and UE3) in total, and each terminal has two uplink ports; then, there are six ports in total. In this case, it is assumed that the foregoing several ports are separately corresponding to one port of each terminal, that is, a port 1 is allocated to the UE1, a port 2 is allocated to the UE2, a port 3 is allocated to the UE3, and other ports may be randomly allocated. In this case, when the base station knows a quantity of terminals, the base station directly determines TA according to reference signals of the foregoing several ports and delivers the TA to each terminal.

407. Send a TA value of each terminal to a terminal corresponding to each uplink port number.

408. Each terminal adjusts the TA value according to the received TA value to implement uplink synchronization.

Figure 5:
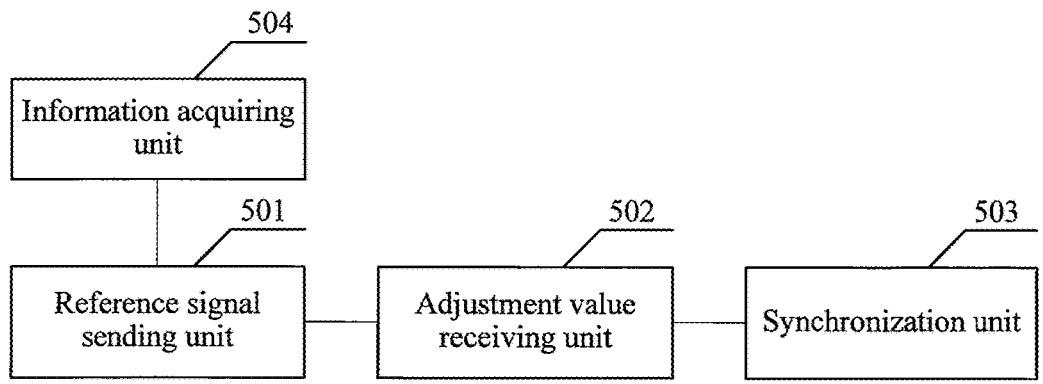
FIG. 5 is a schematic structural diagram of a supporting terminal according to an embodiment of the present invention.

An embodiment of the present invention further provides a terminal, where the terminal is a supporting terminal, as shown in FIG. 5, including:

an information acquiring unit 504, configured to: acquire an access identifier of a benefited terminal, and acquire an uplink port number used by the supporting terminal to send a reference signal;

a reference signal sending unit 501, configured to send a reference signal to an access device through an uplink port by using the access identifier that is of the benefited terminal and that is acquired by the information acquiring unit 504;

an adjustment value receiving unit 502, configured to receive an uplink synchronization information adjustment value from the access device; and a synchronization unit 503, configured to perform uplink synchronization according to the uplink synchronization information adjustment value that is received by the adjustment value receiving unit 502.

The foregoing embodiment is implemented on a supporting terminal side, where a supporting terminal sends a reference signal by using an access identifier of a benefited terminal, and then receives a synchronization information adjustment value of the supporting terminal, so that uplink synchronization is implemented. In this solution, the supporting terminal does not need to access a network, and therefore, interference caused by the supporting terminal to another terminal and the benefited terminal on an access device side is avoided, and a preamble resource is reduced.

Figure 6:
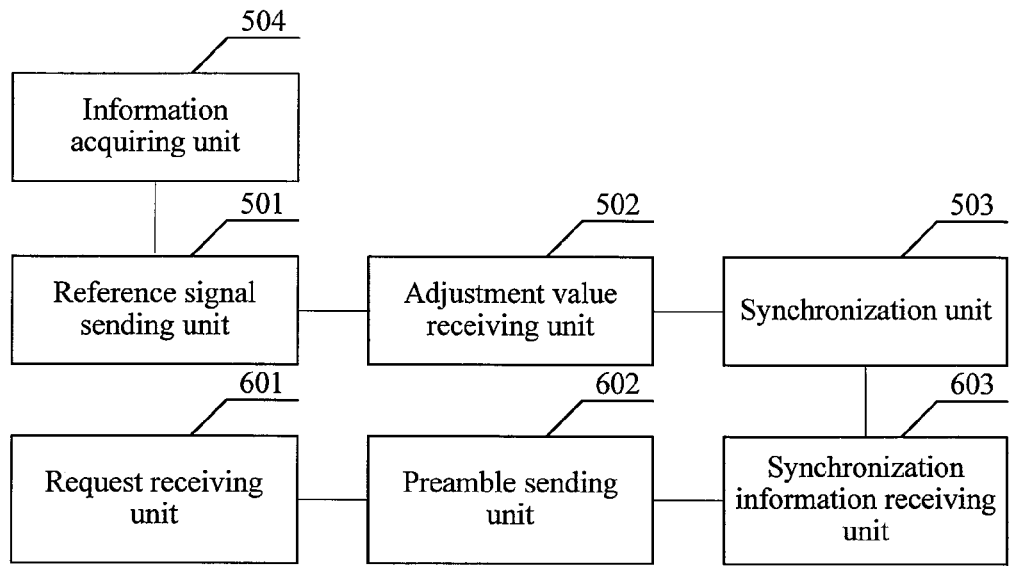
FIG. 6 is a schematic structural diagram of a supporting terminal according to an embodiment of the present invention.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution of initial synchronization, which is as follows: Further, as shown in FIG. 6, the terminal further includes:

a request receiving unit 601, configured to receive a random access request from the benefited terminal before the reference signal sending unit 501 sends the reference signal to the access device through the uplink port;

a preamble sending unit 602, configured to send a preamble signal to the access device after the access request receives the random access request; and a synchronization information receiving unit 603, configured to receive uplink synchronization information returned by the access device according to the preamble signal.

The synchronization unit 503 is further configured to perform uplink synchronization according to the uplink synchronization information received by the synchronization information receiving unit 603.

In this embodiment of the present invention, the preamble signal sent by the supporting terminal is a preamble signal used for access. However, the access device does not need to allocate an access identifier to the supporting terminal, and only needs to determine initial synchronization information. Therefore, the supporting terminal does not need to access a wireless network.

Figure 7:
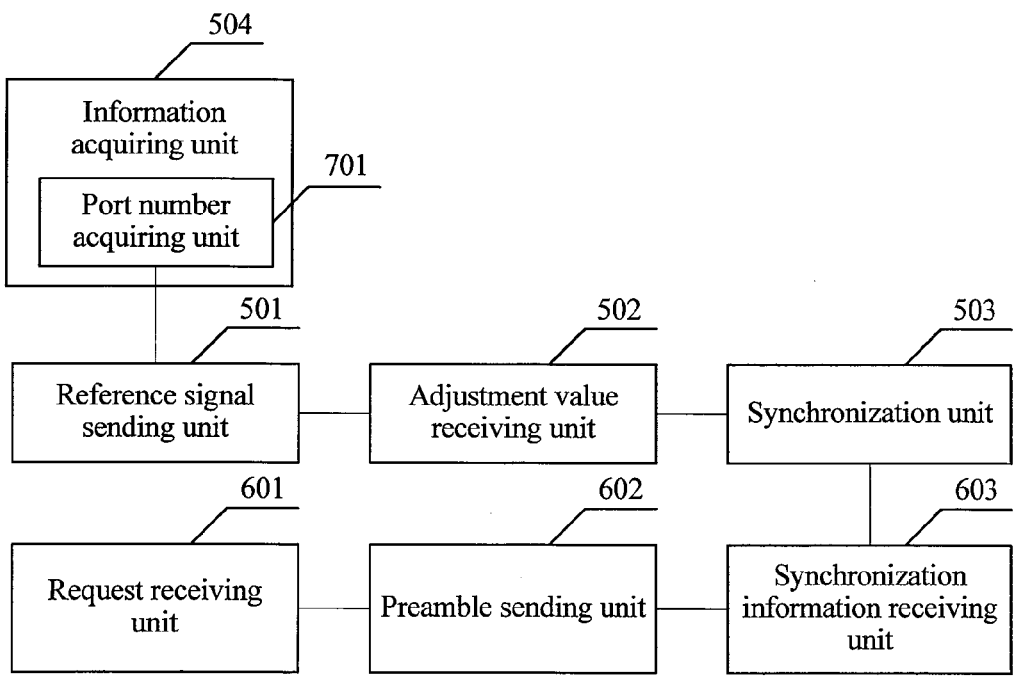
FIG. 7 is a schematic structural diagram of a supporting terminal according to an embodiment of the present invention.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: As shown in FIG. 7, the information acquiring unit 504 includes:

a port number acquiring unit 701, configured to: before the reference signal sending unit 501 sends the reference signal to the access device through the uplink port, confirm an uplink port number currently used by the supporting terminal, or receive an uplink port number allocated by the benefited terminal to the supporting terminal.

Figure 8:
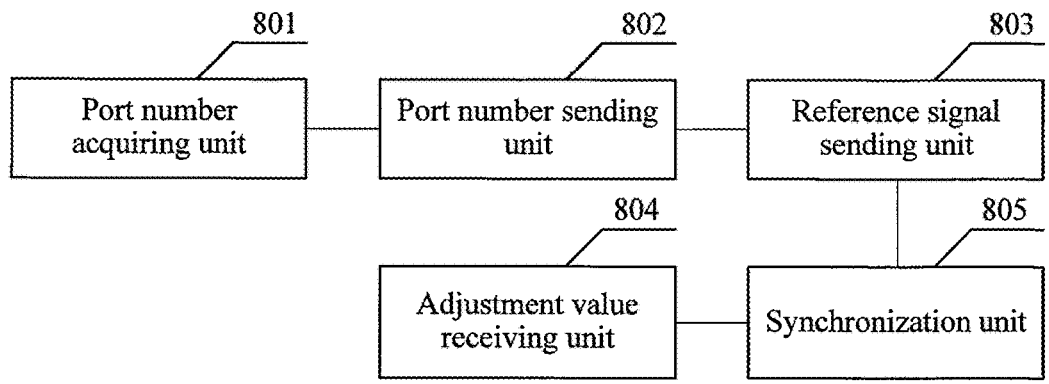
FIG. 8 is a schematic structural diagram of a benefited terminal according to an embodiment of the present invention.

An embodiment of the present invention further provides another terminal, where the terminal is a benefited terminal, as shown in FIG. 8, including:

a port number acquiring unit 801, configured to acquire an uplink port number used by a supporting terminal to send a reference signal;

a port number sending unit 802, configured to send, to an access device through an uplink port, an uplink port number used by the benefited terminal to send the reference signal and the uplink port number that is used by the supporting terminal to send the reference signal and that is acquired by the port number acquiring unit;

a reference signal sending unit 803, configured to send the reference signal to the access device;

an adjustment value receiving unit 804, configured to receive an uplink synchronization information adjustment value from the access device; and a synchronization unit 805, configured to perform uplink synchronization according to the uplink synchronization information adjustment value that is received by the adjustment value receiving unit 804.

The foregoing embodiment is implemented on a benefited terminal side, where a benefited terminal is a demand side of a service, the benefited terminal necessarily accesses a network, and the benefited terminal reports an uplink port number of the benefited terminal by accessing the network, and assists a supporting terminal in reporting work of an uplink port number, so that the supporting terminal does not need to access the network. Therefore, interference caused by the supporting terminal to another terminal and the benefited terminal on an access device side is avoided, and a preamble (preamble signal) resource is reduced.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Optionally, the port number acquiring unit 801 is configured to: allocate, to the supporting terminal, an uplink port number used to send the reference signal, send the uplink port number to the supporting terminal, and determine that the uplink port number sent to the supporting terminal is the uplink port number used by the supporting terminal to send the reference signal; or receive an uplink port number that is sent by the benefited terminal to the benefited terminal and that is used to send the reference signal.

Figure 9:
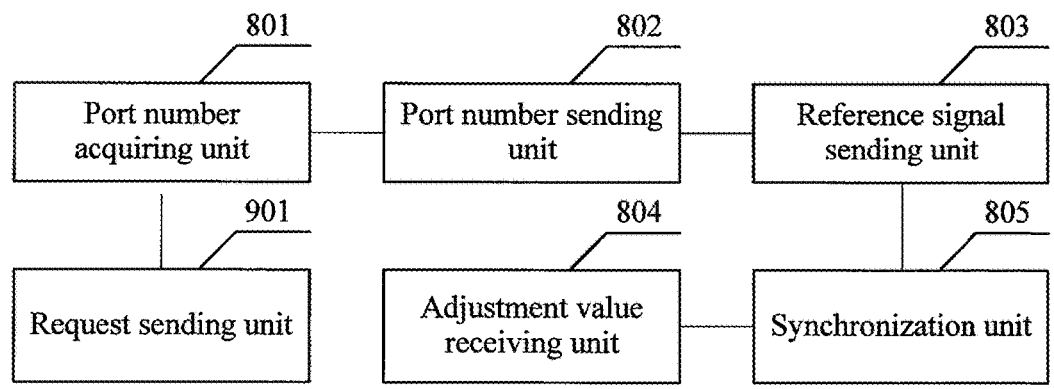
FIG. 9 is a schematic structural diagram of a benefited terminal according to an embodiment of the present invention.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution in which the benefited terminal triggers the supporting terminal to perform initial synchronization, which is as follows: Further, as shown in FIG. 9, the terminal further includes:

a request sending unit 901, configured to send a random access request to the supporting terminal before the port number acquiring unit 801 acquires the uplink port number used by the supporting terminal to send the reference signal, so that the supporting terminal initiates random access to the access device and obtains uplink synchronization information.

Figure 10:
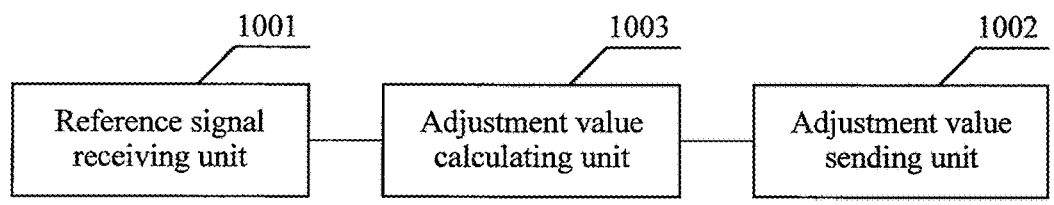
FIG. 10 is a schematic structural diagram of an access device according to an embodiment of the present invention.

An embodiment of the present invention further provides an access device, as shown in FIG. 10, including:

a reference signal receiving unit 1001, configured to: receive the reference signal that is sent by a benefited terminal by using an access identifier of the benefited terminal, and receive the reference signal that is sent by the supporting terminal by using the access identifier of the benefited terminal;

an adjustment value calculating unit 1002, configured to: calculate a synchronization information adjustment value of the benefited terminal according to the reference signal sent by the benefited terminal; and calculate a synchronization information adjustment value of the supporting terminal according to the reference signal sent by the supporting terminal, and send the adjustment value to the supporting terminal; and an adjustment value sending unit 1003, configured to: send the adjustment value that is of the synchronization information of the benefited terminal and that is calculated by the adjustment value calculating unit 1002 to the benefited terminal; and send the adjustment value that is of the synchronization information of the supporting terminal and that is calculated by the adjustment value calculating unit to the supporting terminal.

The foregoing embodiment is implemented on an access device side, where a supporting terminal sends a reference signal by using an access identifier of a benefited terminal, and then receives a synchronization information adjustment value of the supporting terminal, so that uplink synchronization of the benefited terminal is implemented. In addition, reporting work of an uplink port number used by the supporting terminal to send a reference signal is implemented with assistance of the benefited terminal. In this solution, the supporting terminal does not need to access a network, and therefore, interference caused by the supporting terminal to another terminal and the benefited terminal on the access device side is avoided, and a preamble resource is reduced.

Figure 11:
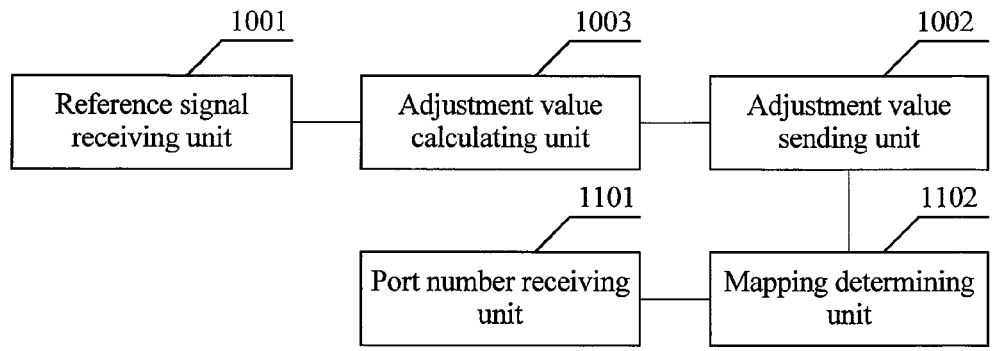
FIG. 11 is a schematic structural diagram of an access device according to an embodiment of the present invention.

Further, this embodiment of the present invention further provides a solution for obtaining an uplink port number on an access device side, which is as follows: As shown in FIG. 11, the access device further includes:

a port number receiving unit 1101, configured to receive an uplink port number from the benefited terminal, where the uplink port number from the benefited terminal includes an uplink port number of the benefited terminal and an uplink port number of the supporting terminal; and a mapping determining unit 1102, configured to determine a correspondence between a uplink port number and a benefited terminal or a supporting terminal according to a mapping rule.

The mapping rule may be a default mapping rule, or may be a mapping rule that is subsequently notified when the benefited terminal sends the uplink port number. A source of the mapping rule does not affect implementation of this embodiment of the present invention, and is not limited in this embodiment of the present invention.

Figure 12:
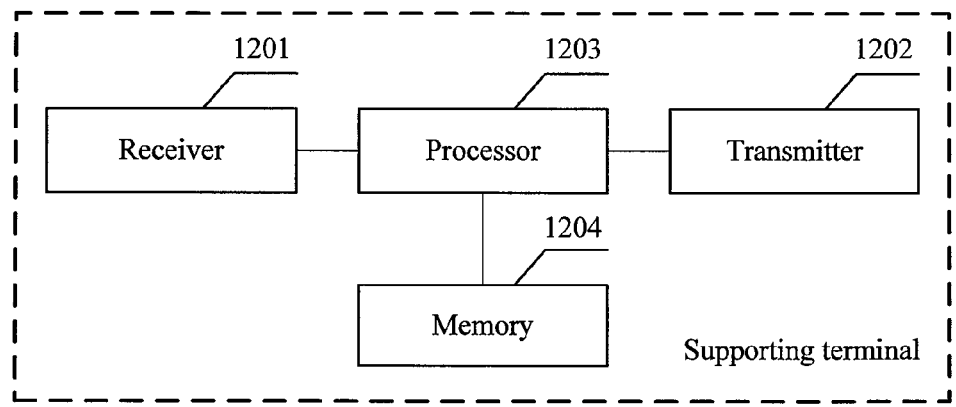
FIG. 12 is a schematic structural diagram of a supporting terminal according to an embodiment of the present invention.

An embodiment of the present invention further provides a terminal, where the terminal is used as a supporting terminal. As shown in FIG. 12, the terminal includes: a receiver 1201, a transmitter 1202, a processor 1203, and a memory 1204.

The processor 1203 is configured to: acquire an access identifier of a benefited terminal, and acquire an uplink port number used by the supporting terminal to send a reference signal; control sending of a reference signal to an access device through an uplink port by using the access identifier of the benefited terminal; receive an uplink synchronization information adjustment value from the access device; and perform uplink synchronization according to the received adjustment value of the uplink synchronization information.

The foregoing embodiment is implemented on a supporting terminal side, where a supporting terminal sends a reference signal by using an access identifier of a benefited terminal, and then receives a synchronization information adjustment value of the supporting terminal, so that uplink synchronization is implemented. In this solution, the supporting terminal does not need to access a network, and therefore, interference caused by the supporting terminal to another terminal and the benefited terminal on an access device side is avoided, and a preamble resource is reduced.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution of initial synchronization, which is as follows: Further, before the controlling sending of a reference signal to an access device through an uplink port, the processor 1203 is further configured to: control receiving of a random access request from the benefited terminal; instruct to send a preamble signal to the access device; receive uplink synchronization information returned by the access device according to the preamble signal; and perform uplink synchronization according to the received uplink synchronization information.

In this embodiment of the present invention, the preamble signal sent by the supporting terminal is a preamble signal used for access. However, the access device does not need to allocate an access identifier to the supporting terminal, and only needs to determine initial synchronization information. Therefore, the supporting terminal does not need to access a wireless network.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Further, the processor 1203 is configured to: confirm an uplink port number currently used by the supporting terminal, or control receiving of an uplink port number allocated by the benefited terminal to the supporting terminal.

Figure 13:
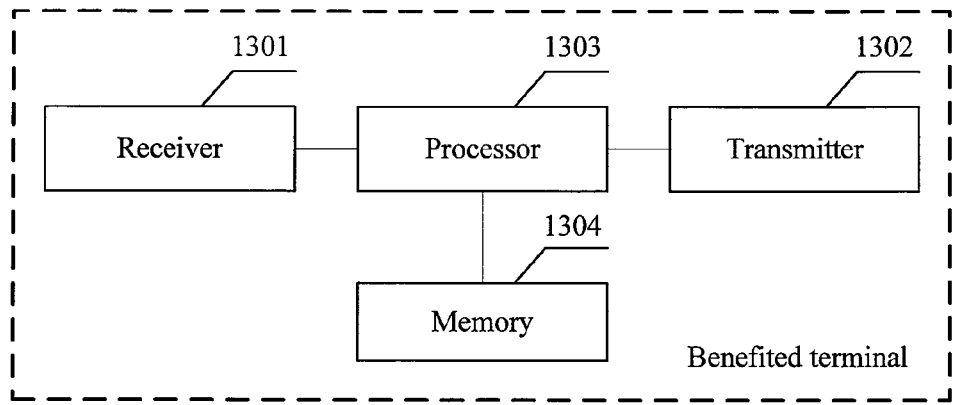
FIG. 13 is a schematic structural diagram of a benefited terminal according to an embodiment of the present invention.

An embodiment of the present invention further provides another terminal, where the terminal is used as a benefited terminal. As shown in FIG. 13, the terminal includes: a receiver 1301, a transmitter 1302, a processor 1303, and a memory 1304.

The processor 1303 is configured to: acquire an uplink port number used by a supporting terminal to send a reference signal; control sending, to an access device through an uplink port, of an uplink port number used by the benefited terminal to send the reference signal and the uplink port number used by the supporting terminal to send the reference signal; send the reference signal to the access device; receive an uplink synchronization information adjustment value from the access device; and perform uplink synchronization according to the received adjustment value of the uplink synchronization information.

The foregoing embodiment is implemented on a benefited terminal side, where a benefited terminal is a demand side of a service, the benefited terminal necessarily accesses a network, and the benefited terminal reports an uplink port number of the benefited terminal by accessing the network, and assists a supporting terminal in reporting work of an uplink port number, so that the supporting terminal does not need to access the network. Therefore, interference caused by the supporting terminal to another terminal and the benefited terminal on an access device side is avoided, and a preamble (preamble signal) resource is reduced.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Optionally, that the processor 1303 is configured to acquire an uplink port number used by a supporting terminal to send a reference signal includes: allocating, to the supporting terminal, an uplink port number used to send the reference signal, sending the uplink port number to the supporting terminal, and determining that the uplink port number sent to the supporting terminal is the uplink port number used by the supporting terminal to send the reference signal; or control receiving of an uplink port number that is sent by the benefited terminal to the benefited terminal and that is used to send the reference signal.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution in which the benefited terminal triggers the supporting terminal to perform initial synchronization, which is as follows: Further, before the benefited terminal acquires the uplink port number used by the supporting terminal to send a reference signal, the processor 1303 is further configured to control sending of a random access request to the supporting terminal, so that the supporting terminal initiates random access to the access device and obtains uplink synchronization information.

Figure 14:
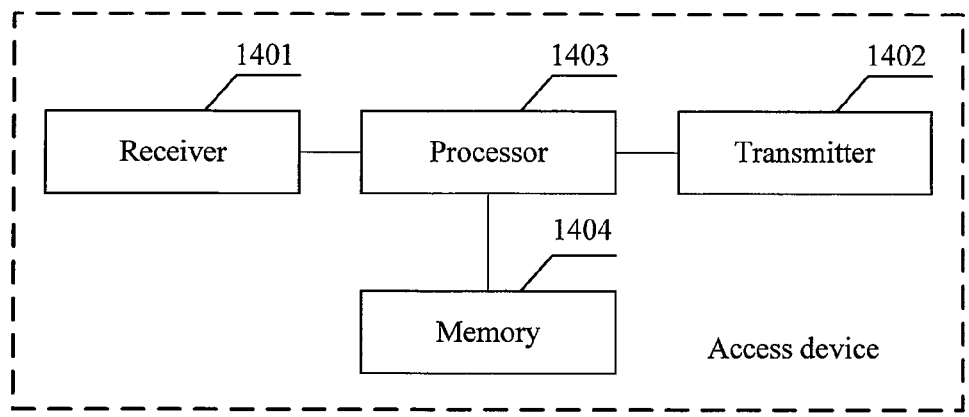
FIG. 14 is a schematic structural diagram of an access device according to an embodiment of the present invention.

An embodiment of the present invention further provides an access device. As shown in FIG. 14, the access device includes: a receiver 1401, a transmitter 1402, a processor 1403, and a memory 1404.

The processor 1403 is configured to: control receiving of the reference signal that is sent by a benefited terminal by using an access identifier of the benefited terminal, and receiving the reference signal that is sent by the supporting terminal by using the access identifier of the benefited terminal; calculate a synchronization information adjustment value of the benefited terminal according to the reference signal sent by the benefited terminal, and send the adjustment value to the benefited terminal; and calculate a synchronization information adjustment value of the supporting terminal according to the reference signal sent by the supporting terminal, and send the adjustment value to the supporting terminal.

The foregoing embodiment is implemented on an access device side, where a supporting terminal sends a reference signal by using an access identifier of a benefited terminal, and then receives a synchronization information adjustment value of the supporting terminal, so that uplink synchronization of the benefited terminal is implemented. In addition, reporting work of an uplink port number used by the supporting terminal to send a reference signal is implemented with assistance of the benefited terminal. In this solution, the supporting terminal does not need to access a network, and therefore, interference caused by the supporting terminal to another terminal and the benefited terminal on the access device side is avoided, and a preamble resource is reduced.

Further, this embodiment of the present invention further provides a solution for an obtaining an uplink port number on an access device side, which may be specifically as follows: the processor 1403 is further configured to: control receiving of an uplink port number from the benefited terminal, where the uplink port number from the benefited terminal includes an uplink port number of the benefited terminal and an uplink port number of the supporting terminal; and determine a correspondence between a uplink port number and a benefited terminal or a supporting terminal according to a mapping rule.

The mapping rule may be a default mapping rule, or may be a mapping rule that is subsequently notified when the benefited terminal sends the uplink port number. A source of the mapping rule does not affect implementation of this embodiment of the present invention, and is not limited in this embodiment of the present invention.

Figure 15:
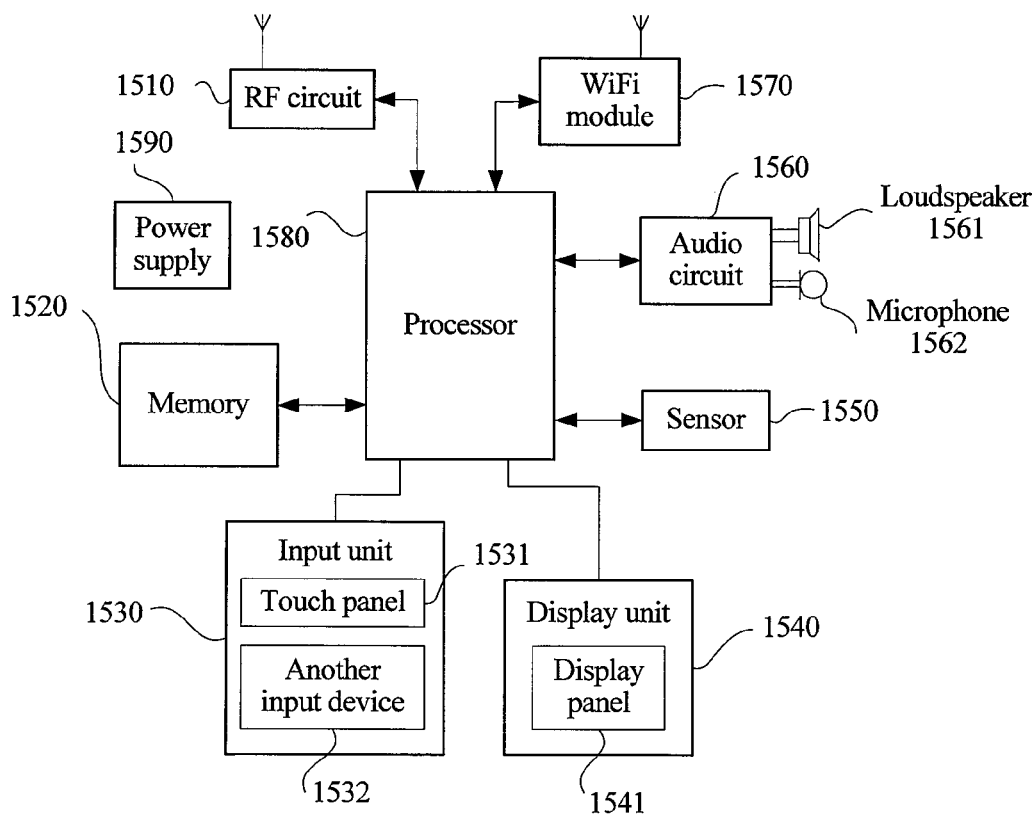
FIG. 15 is a schematic structural diagram of a terminal according to an embodiment of the present invention.

An embodiment of the present invention further provides another terminal, as shown in FIG. 15. For ease of description, only a part related to this embodiment of the present invention is illustrated. For specific technical details that are not disclosed, refer to a method part of an embodiment of the present invention. The terminal may be any terminal device, including: a mobile phone, a tablet computer, a PDA (personal digital assistant), a POS (point of sales), a vehicle-mounted computer, or the like, and for example, the terminal is a mobile phone.

FIG. 15 shows a block diagram of a partial structure of a mobile phone related to the terminal provided in this embodiment of the present invention. Referring to FIG. 15, the mobile phone includes parts such as a radio frequency (RF) circuit 1510, a memory 1520, an input unit 1530, a display unit 1540, a sensor 1550, an audio circuit 1560, a wireless fidelity (WiFi) module 1570, a processor 1580, and a power supply 1590. A person skilled in the art may understand that the structure of the mobile phone shown in FIG. 15 does not constitute any limitation on the mobile phone, and instead the mobile phone may include parts more or fewer than those shown in the figure, or a combination of some parts, or parts arranged differently.

The following describes each integral part of the mobile phone in detail with reference to FIG. 15:

The RF circuit 1510 may be configured to receive and send a signal in an information receiving or sending process or a call process, and in particular, after receiving downlink information of a base station, send the downlink information to the processor 1580 for processing; and in addition, send designed uplink data to the base station. Generally, the RF circuit includes but is not limited to an antenna, at least one amplifier, a transceiver, a coupler, a low noise amplifier (LNA), a duplexer, and the like. In addition, the RF circuit 1510 may further communicate with a network and another device by means of wireless communication. The wireless communication may use any communications standard or protocol, which includes but is not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 1520 may be configured to store a software program and a module, and the processor 1580 executes various function applications of the mobile phone and performs data processing by running the software program and the module that are stored in the memory 1520. The memory 1520 may mainly include a program storage area and a data storage area, where the program storage area may store an operating system, an application program required by at least one function (such as a voice playing function and an image playing function), and the like, and the data storage area may store data (such as audio data and a phone book) created according to use of the mobile phone, and the like. In addition, the memory 1520 may include a high-speed random access memory, and may further include a non-volatile memory, for example, at least one magnetic disk storage component, a flash memory component, or another volatile solid-state storage component.

The input unit 1530 may be configured to receive entered digits or character information, and generate key signal input related to user setting and function control of the mobile phone 1500. Specifically, the input unit 1530 may include a touch panel 1531 and another input device 1532. The touch panel 1531 is also referred to as a touchscreen and may collect a touch operation (such as an operation performed by a user on the touch panel 1531 or near the touch panel 1531 by using any proper object or accessory, such as a finger or a stylus) on or near the touch panel, and drive a corresponding connection apparatus according to a preset program. Optionally, the touch panel 1531 may include two parts: a touch detection apparatus and a touch controller. The touch detection apparatus detects a touch location of a user, detects a signal brought by the touch operation, and sends the signal to the touch controller. The touch controller receives touch information from the touch detection apparatus, converts the touch information into touch coordinates, and sends the touch coordinates to the processor 1580, and can receive and execute a command sent by the processor 1580. In addition, the touch panel 1531 may be implemented by using multiple types such as a resistive type, a capacitive type, an infrared ray, and a surface acoustic wave. The input unit 1530 may further include another input device 1532 in addition to the touch panel 1531. Specifically, the another input device 1532 may include but is not limited to one or more of a physical keyboard, a function key (such as a volume control key or an on/off key), a trackball, a mouse, an operating lever, and the like.

The display unit 1540 may be configured to display information entered by the user or information provided for the user, and various menus of the mobile phone. The display unit 1540 may include a display panel 1541. Optionally, a form such as a liquid crystal display (LCD) and an organic light-emitting diode (OLED) may be used to configure the display panel 1541. Further, the touch panel 1531 may cover the display panel 1541. When detecting a touch operation on or near the touch panel 1531, the touch panel 1531 transmits the touch operation to the processor 1580 to determine a type of a touch event, and then the processor 1580 provides corresponding visual output on the display panel 1541 according to the type of the touch event. In FIG. 15, the touch panel 1531 and the display panel 1541 are used as two independent parts to implement input and output functions of the mobile phone. However, in some embodiments, the touch panel 1531 and the display panel 1541 may be integrated to implement the input and output functions of the mobile phone.

The mobile phone 1500 may further include at least one sensor 1550, such as an optical sensor, a motion sensor, or another sensor. Specifically, the light sensor may include an ambient light sensor and a proximity sensor, where the ambient light sensor may adjust luminance of the display panel 1541 according to brightness of ambient light, and the proximity sensor may turn off the display panel 1541 and/or backlight when the mobile phone moves to an ear. As one type of a motion sensor, an accelerometer sensor may detect a value of acceleration in each direction (generally, three axes); while at rest, may detect a value and a direction of gravity; and may be used in an application that recognizes a mobile phone posture (such as screen switching between portrait and landscape modes, a related game, and magnetometer posture calibration), a function related to vibration recognition (such as a pedometer and knocking), and the like. For another sensor that may be arranged on the mobile phone, such as a gyroscope, a barometer, a hygrometer, a thermometer, or an infrared ray sensor, no further details are provided herein.

The audio circuit 1560, a loudspeaker 1561, and a microphone 1562 may provide an audio interface between the user and the mobile phone. The audio circuit 1560 may transmit, to the loudspeaker 1561, an electrical signal converted from received audio data, and the loudspeaker 1561 converts the electrical signal to a sound signal for output; in another aspect, the microphone 1562 converts a collected sound signal into an electrical signal, and the audio circuit 1560 converts the electrical signal into audio data upon receipt of the electrical signal and outputs the audio data to the processor 1580 for processing, and then the audio data is sent to, for example, another mobile phone, by using the RF circuit 1510, or the audio data is output to the memory 1520 for further processing.

WiFi belongs to a short-distance wireless transmission technology. The mobile phone may help, by using the WiFi module 1570, the user to send and receive an email, browse a web page, access streaming media, and the like. The WiFi module 1570 provides wireless broadband Internet access for the user. Although FIG. 15 shows the WiFi module 1570, it may be understood that the WiFi module is not a mandatory part of the mobile phone 1500, and may completely be omitted according to a need without changing the essence of the present invention.

The processor 1580 is a control center of the mobile phone and is connected to each part of the entire mobile phone by using various interfaces and lines, and performs, by running or executing the software program and/or module that are stored in the memory 1520 and invoking data stored in the memory 1520, various functions of the mobile phone and data processing, so as to perform overall monitoring on the mobile phone. Optionally, the processor 1580 may include one or more processing units. Preferably, an application processor and a modem processor may be integrated into the processor 1580, where the application processor mainly processes an operating system, a user interface, an application program, and the like; and the modem processor mainly processes wireless communication. It may be understood that the foregoing modem processor may also not be integrated into the processor 1580.

The mobile phone 1500 further includes the power supply 1590 (such as a battery) that supplies power to each part. Preferably, the power supply may be logically connected to the processor 1580 by using a power management system, so as to implement a management function such as charging, discharging, and power consumption management by using the power management system.

The cell phone 1500 may further include a camera, a Bluetooth module, and the like, which are not shown though and are not described herein repeatedly.

In this embodiment of the present invention, the processor 1580 included in the terminal further has the following functions:

If the terminal is used as a supporting terminal, the processor 1580 is configured to: acquire an access identifier of a benefited terminal, and acquire an uplink port number used by the supporting terminal to send a reference signal; control sending of a reference signal to an access device through an uplink port by using the access identifier of the benefited terminal; receive an uplink synchronization information adjustment value from the access device; and perform uplink synchronization according to the received uplink synchronization information adjustment value.

The foregoing embodiment is implemented on a supporting terminal side, where a supporting terminal sends a reference signal by using an access identifier of a benefited terminal, and then receives a synchronization information adjustment value of the supporting terminal, so that uplink synchronization is implemented. In this solution, the supporting terminal does not need to access a network, and therefore, interference caused by the supporting terminal to another terminal and the benefited terminal on an access device side is avoided, and a preamble resource is reduced.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution of initial synchronization, which is as follows: Further, before the controlling sending of a reference signal to an access device through an uplink port, the processor 1580 is further configured to: control receiving of a random access request from the benefited terminal; instruct to send a preamble signal to the access device; receive uplink synchronization information returned by the access device according to the preamble signal; and perform uplink synchronization according to the received uplink synchronization information.

In this embodiment of the present invention, the preamble signal sent by the supporting terminal is a preamble signal used for access. However, the access device does not need to allocate an access identifier to the supporting terminal, and only needs to determine initial synchronization information. Therefore, the supporting terminal does not need to access a wireless network.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Further, the processor 1580 is configured to: confirm an uplink port number currently used by the supporting terminal, or control receiving of an uplink port number allocated by the benefited terminal to the supporting terminal.

If the terminal is used as a benefited terminal, the processor 1580 is configured to: acquire an uplink port number used by a supporting terminal to send a reference signal, control sending, to an access device through an uplink port, of an uplink port number used by the benefited terminal to send the reference signal and the uplink port number used by the supporting terminal to send the reference signal; send the reference signal to the access device; receive an uplink synchronization information adjustment value from the access device; and perform uplink synchronization according to the received adjustment value of the uplink synchronization information.

The foregoing embodiment is implemented on a benefited terminal side, where a benefited terminal is a demand side of a service, the benefited terminal necessarily accesses a network, and the benefited terminal reports an uplink port number of the benefited terminal by accessing the network, and assists a supporting terminal in reporting work of an uplink port number, so that the supporting terminal does not need to access the network. Therefore, interference caused by the supporting terminal to another terminal and the benefited terminal on an access device side is avoided, and a preamble (preamble signal) resource is reduced.

In this embodiment of the present invention, the uplink port number used by the supporting terminal to send a reference signal may be determined by the supporting terminal, or may be allocated by the benefited terminal. This embodiment of the present invention provides an example for a solution of a source of the uplink port number used by the supporting terminal to send a reference signal, which is as follows: Optionally, that the processor 1580 is configured to acquire an uplink port number used by a supporting terminal to send a reference signal includes: allocating, to the supporting terminal, an uplink port number used to send the reference signal, sending the uplink port number to the supporting terminal, and determining that the uplink port number sent to the supporting terminal is the uplink port number used by the supporting terminal to send the reference signal; or control receiving of an uplink port number that is sent by the benefited terminal to the benefited terminal and that is used to send the reference signal.

In the foregoing embodiment, uplink synchronization in a communication process can be resolved, and in this solution, an adjustment of synchronization information can be implemented. Therefore, before the adjustment of the synchronization information, there may be an initialization process, that is, initial synchronization. This embodiment of the present invention further provides an implementation solution in which the benefited terminal triggers the supporting terminal to perform initial synchronization, which is as follows: Further, before the benefited terminal acquires the uplink port number used by the supporting terminal to send a reference signal, the processor 1580 is further configured to control sending of a random access request to the supporting terminal, so that the supporting terminal initiates random access to the access device and obtains uplink synchronization information.

It may be understood that the terminal may have a capability of being used as a supporting terminal, and may also have a capability of being used as a benefited terminal, and therefore, the foregoing processor may have all functions in this embodiment.

It should be noted that, the apparatus division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. An access device, comprising:
a receiver, a transmitter, and a memory for storing instructions; and
a processor coupled to the memory, wherein the instructions when executed by the processor cause the access device to:
receive, by the receiver a reference signal that is sent by a benefited terminal by using an access identifier of the benefited terminal, and receive a reference signal that is sent by a supporting terminal by using the access identifier of the benefited terminal,
calculate a synchronization information adjustment value of the benefited terminal according to the reference signal sent by the benefited terminal,
calculate a synchronization information adjustment value of the supporting terminal according to the reference signal sent by the supporting terminal,
send, by the transmitter, the synchronization information adjustment value of the benefited terminal to the benefited terminal,
send, by the transmitter, the synchronization information adjustment value of the supporting terminal to the supporting terminal,
receive, by the receiver, an uplink port number from the benefited terminal, wherein the uplink port number from the benefited terminal comprises an uplink port number of the benefited terminal and an uplink port number of the supporting terminal, and
determine a correspondence between an uplink port number and a benefited terminal or a supporting terminal according to a mapping rule.

2. An uplink synchronization method, comprising:
receiving, by an access device, a reference signal that is sent by a benefited terminal by using an access identifier of the benefited terminal, and receiving a reference signal that is sent by a supporting terminal by using the access identifier of the benefited terminal;
calculating, by the access device, a synchronization information adjustment value of the benefited terminal according to the reference signal sent by the benefited terminal, and sending the synchronization information adjustment value of the benefited terminal to the benefited terminal;
calculating a synchronization information adjustment value of the supporting terminal according to the reference signal sent by the supporting terminal, and sending the synchronization information adjustment value of the supporting terminal to the supporting terminal;
receiving, by the access device, an uplink port number from the benefited terminal, wherein the uplink port number from the benefited terminal comprises an uplink port number of the benefited terminal and an uplink port number of the supporting terminal; and
determining, by the access device, a correspondence between an uplink port number and a benefited terminal or a supporting terminal according to a mapping rule.

* * * * *